(12) United States Patent
Gilbert

(10) Patent No.: US 8,403,085 B1
(45) Date of Patent: Mar. 26, 2013

(54) POWER APPLICATION DEVICE

(76) Inventor: Timothy A. Gilbert, Camarillo, CA (US)

( * ) Notice: Subject to any disclaimer, the term of this patent is extended or adjusted under 35 U.S.C. 154(b) by 311 days.

(21) Appl. No.: 12/807,687

(22) Filed: Sep. 13, 2010

(51) Int. Cl.
  *B60K 1/00* (2006.01)
(52) U.S. Cl. .............. 180/65.1; 280/87.041; 280/87.042
(58) Field of Classification Search ........ 180/19.1–19.3; 280/87.041, 87.042
See application file for complete search history.

(56) References Cited

U.S. PATENT DOCUMENTS

| | | | |
|---|---|---|---|
| 854,299 A | 5/1907 | Matson | |
| 1,672,700 A | 6/1928 | Vass | |
| 2,239,122 A | 4/1941 | Stokes | |
| 2,257,653 A | 9/1941 | Russell | |
| 4,033,317 A * | 7/1977 | Aspin | 123/190.14 |
| 4,073,356 A | 2/1978 | Schlicht | |
| 4,456,089 A * | 6/1984 | Kuwahara | 180/180 |
| 5,020,621 A | 6/1991 | Martin | |
| 5,127,488 A | 7/1992 | Shanahan | |
| 6,626,255 B1 * | 9/2003 | Timm | 180/7.1 |
| 6,631,777 B1 * | 10/2003 | Thompson | 180/180 |

* cited by examiner

*Primary Examiner* — Jeffrey J Restifo
*Assistant Examiner* — Erez Gurari
(74) *Attorney, Agent, or Firm* — Albert O. Cota

(57) ABSTRACT

A power application device (PAD) (10) designed to operate in combination with a four-wheeled vehicle (110) such as a skateboard (112). The PAD (10) includes an attachment tube (12) having a front end (14) and a rear end (16). Between the front and rear ends (14,16) are located a front body support (32) and an optional rear body support (38). To the front end (14) of the attachment tube (12) is attached a handle bar (22) and to the rear end (16) is attached a drive wheel (90). The drive wheel (90) is rotated by a drive-wheel powering means (40) that consists of either a d-c motor (50) or an internal combustion engine (80). The motor (50) or engine (80) is operated respectively by a variable resistor (56) or a throttle control (86) located on the handle bar (22). To operate the PAD (10) a rider stands on the skateboard (112) and the PAD (10) is activated causing the drive wheel (90) to rotate, thereby causing the PAD (10) to move forward in unison with the skateboard (112).

11 Claims, 7 Drawing Sheets

POWER APPLICATION DEVICE

TECHNICAL FIELD

The invention generally pertains to power application devices, and more particularly to a power application device that operates in combination with an external foot-operated wheeled vehicle such as a four-wheeled skateboard.

BACKGROUND ART

As is well known in the prior art, a skateboard typically includes an elongated deck having an upper surface and a lower surface. The upper surface supports the feet of the skateboard rider and the lower surface has two sets of trucks that are longitudinally spaced. Skateboard trucks have attached front and back sets of wheels that have the ability to both travel over an up and down range as well as pivot around a central point forward and aft. A central axle extends through the trucks and into the wheels which are rotatably attached to the ends of the trucks.

The rider stands on the upper surface of the board and by shifting the location of the feet and center of gravity, tilts the board to cause change of direction. Conventional skateboards require that a rider provide the propelling force to move, in the form of placing one of the rider's feet on the ground and pushing with that foot as the other foot remains on the top surface of the board. By virtue of the manual propulsion, a conventional skateboard has limitations in both speed as well as the fact that the rider can tire over a period of time. To alleviate the tiring problem motorized skateboards can be utilized.

The problem with motorized skateboards is that they apply their power of acceleration, deceleration and braking to the ground via the skateboard's wheels, thus the rider is standing on the skateboard that is bearing the riders entire weight and center of gravity directly over the skateboard and its wheels. Since this condition exists, applying acceleration, deceleration or braking power to the ground via the skateboard wheels that are in direct proximity to the rider's feet causes instability to the rider and their center of gravity. When forward momentum power is applied to a motorized skateboard the sensation and condition that is created is one in which the rider feels that the board is being pushed out from under the rider. The reason for this is that power is being applied and delivered directly to the rider's feet. Only very gradual and moderate power of acceleration can be applied to avoid this condition of imbalance. Conversely, when motorized skateboards are in motion and the brakes are applied, it causes an exact opposite similar sensation and condition to the rider. On these skateboards braking causes the board to brake first, then the rider and their center of gravity second. This creates a tripping or falling forward condition and sensation. The rider must react and adjust to the stopping energy of the skateboard in order to avoid falling forward, especially under severe or hard braking conditions. Simply stated, braking on these self-contained skateboards causes the board to slow and stop before the rider's center of gravity, thereby causing an unstable condition and sensation of imbalance to the rider.

When operating the PAD the rider applies the energy of acceleration, deceleration and braking to their center of gravity, rather than applying these same energies to their feet, as is done on existing motorized skateboards. The engine or the electric d-c motor, battery, fuel tank and other elements that involved with the operation of the PAD that is of considerable weight is situated around or near the axle of the PAD drive wheel. All parts including the handle bar and controls will be balanced under, over and around, fore and aft of the axle of the drive wheel. All power of propulsion, acceleration, deceleration, and braking are applied to the ground terrestrially through the single drive wheel. All the power or energy of acceleration, deceleration and braking is applied to the rider's center of gravity from the engine/motor and the drive wheel, through the frame structure of the PAD.

A search of the prior art did not disclose literature or patents that read directly on the claims of the instant invention. However, the following U.S. patents are considered related.

| PAT. NO. | INVENTOR | ISSUED |
|---|---|---|
| 5,127,488 | Shanahan | 7 Jul. 1992 |
| 4,073,356 | Schlicht | 14 Feb. 1978 |
| 2,239,122 | Stokes | 22 Apr. 1941 |

The U.S. Pat. No. 5,127,488 patent discloses a power supplying accessory that can readily be retrofitted to an unpowered skateboard. The accessory includes a leaf spring having a front end and a rear end. The front end includes holes sized and spaced to fit on threaded fasteners that attach the rear truck of the skateboard. The leaf spring is secured between the rear truck and the body of the skateboard. The rear end of the leaf spring is attached to a drive assembly that includes an internal combustion engine, a drive wheel and a speed reduce. When the skateboard is loaded, the leaf spring preloads the drive wheel against the ground while the use of the rear truck of the skateboard permits the skateboard to retain its steering characteristics, thereby making it easy to learn to use.

The U.S. Pat. No. 4,073,356 patent discloses a skateboard having a fifth wheel attached to the board and coupled to a motor mounted on the board. The fifth wheel is attached to the board and extends through a slot in the board for coupling to the motor. The drive wheel does not contact the ground to drive the board unless the weight of a person on the board is distributed toward the center of the board.

The U.S. Pat. No. 2,239,122 patent discloses a power-operated vehicle that is in the form of a wheel-barrow. The vehicle allows the operator to walk with little effort while being propelled by the vehicle.

For background purposes and as indicative of the art to which the invention relates, reference may be made to the following remaining patents found in the search:

| PAT. NO. | INVENTOR | ISSUED |
|---|---|---|
| 854,299 | Matson | 21 May 1907 |
| 1,672,700 | Vass | 5 Jun. 1928 |
| 2,257,653 | Russell | 30 Sep. 1941 |
| 5,020,621 | Martin | 4 Jun. 1991 |

DISCLOSURE OF THE INVENTION

The power application device (PAD), which is also known as PRO STREET RAILER™, is designed to operate in combination with a four-wheeled vehicle such as a conventional four-wheeled skateboard. To operate the PAD a rider places their feet on the skateboard and activates the PAD. The activated PAD allows a drive wheel located at the rear of the PAD to rotate which, in turn, causes the PAD to move forward in unison with the skateboard. In its basic design configuration the PAD consists of:

A. A main frame, which is referred to as an attachment tube, having a front end, a rear end, an upper surface, a lower surface and that can can consist of a tube having a circular cross-section or a rectangular cross-section. To compensate for the height of the PAD rider, the attachment tube is vertically angled or curved to allow the front end of the tube to be elevated from the rear end of the tube. The attachment tube also has a horizontally curved section that extends around the rider's midsection and center of gravity. The curved section allows the rider to maintain a straight line that extends from the front end to the rear end of the attachment tube.

B. A handle bar having a right grip, a left grip and a center section having a post that is inserted into a vertical post sleeve located on the front end of the attachment tube.

C. A front body support that is adjustably attached to the upper surface of the attachment tube rearward from the handle bar.

D. An optional rear body support that is adjustably attached to the upper surface of the attachment tube rearward from the front body support.

E. A drive wheel that is rotatably attached to the rear end of the attachment tube, and that is rotated by a drive-wheel powering means that is controlled by the PAD rider.

The wheel powering means can consist of either an electric d-c motor or an internal combustion engine. To safely operate the PAD, a brake that interfaces with the drive wheel is utilized. The brake is operated by a hand-controlled lever that is attached to the handle bar.

In view of the above disclosure the primary object of the invention is to allow a PAD rider to control the acceleration, deceleration and braking that is applied to a skateboard or the like. The PAD operates without causing any unbalance or instability to the PAD rider and/or to the skateboard.

In addition to the primary object of the invention, it is also an object of the invention to produce a PAD that:
  can be dimensioned to accommodate various sizes of skateboards, roller blades or roller skates,
  can be designed to include headlights, tail-lights and turn-signals,
  allows a rider to control the level of acceleration, deceleration and braking that is applied to the skateboard,
  can be designed with various horsepower ratings to determine maximum speeds,
  can be used with various types or sizes of drive wheels to compensate for the terrain on which the PAD is being operated,
  allows the energy of acceleration, deceleration and braking to be applied to the rider's center of gravity, rather than applying the energy to the rider's feet as is applied while using powered skateboards, and
  is cost effective from both a consumer's and manufacturer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
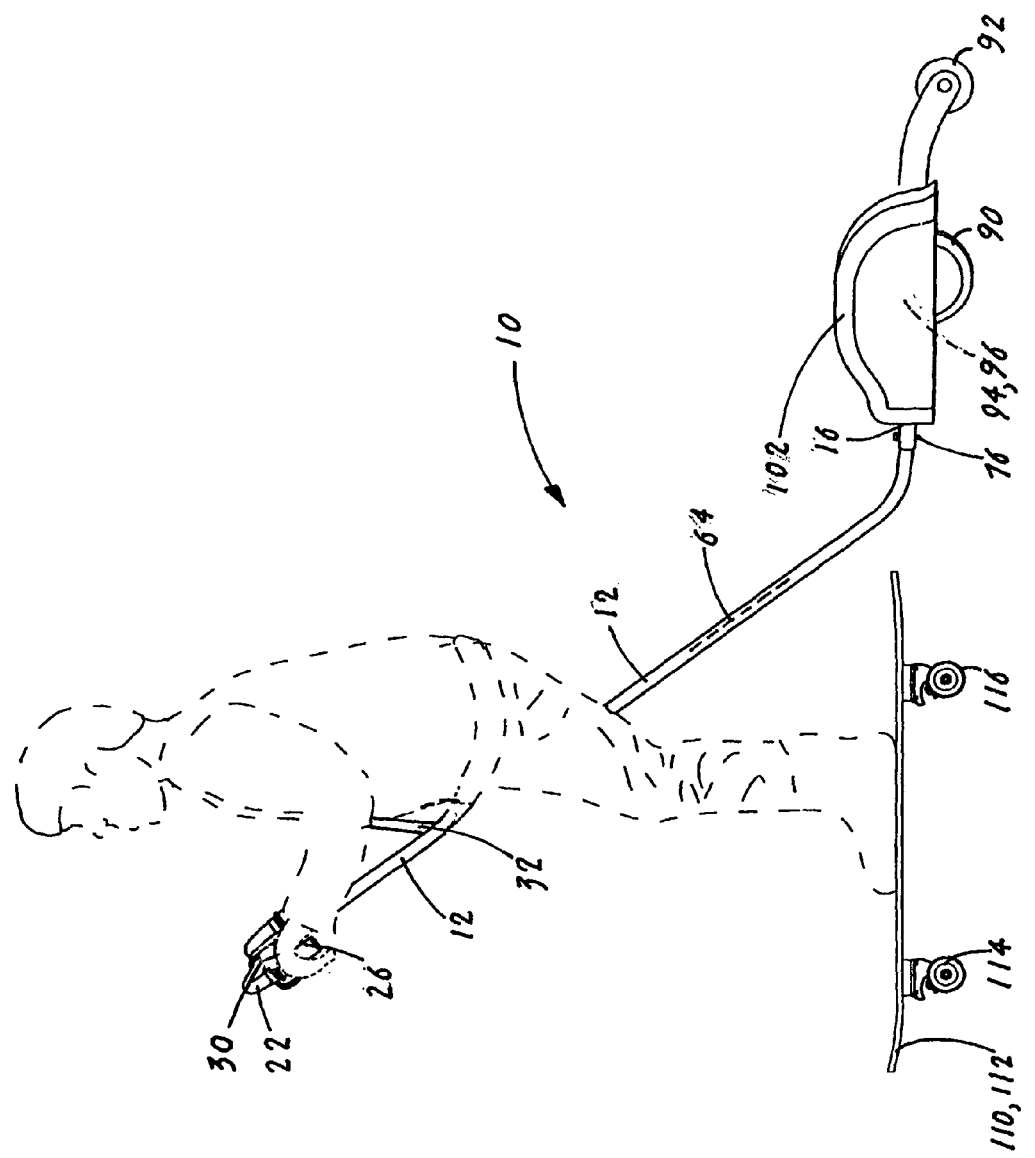
FIG. 1 is a side elevational view of the power application device (PAD) shown with a PAD rider.

The best mode for carrying out the invention is presented in terms that disclose a preferred embodiment of a power application device (PAD 10). The PAD 10, as shown in FIGS. 1-10, is comprised of the following major elements: an attachment tube 12, a handle bar 22, a front body support 32, an optional rear body support 38 and a drive wheel 90 that is operated and controlled by a drive-wheel powering means 40 that can consist of either an electrical power circuit 42 or an internal combustion engine system 78.

The PAD 10 is designed to operate in combination with a variety of four-wheeled vehicles 110. However, for brevity the four-wheeled vehicle 110 will be limited in this disclosure, to a standard skateboard 112 having a two-wheeled front truck 114 and a two-wheeled rear truck 116, as shown in FIG. 1.

Figure 2:
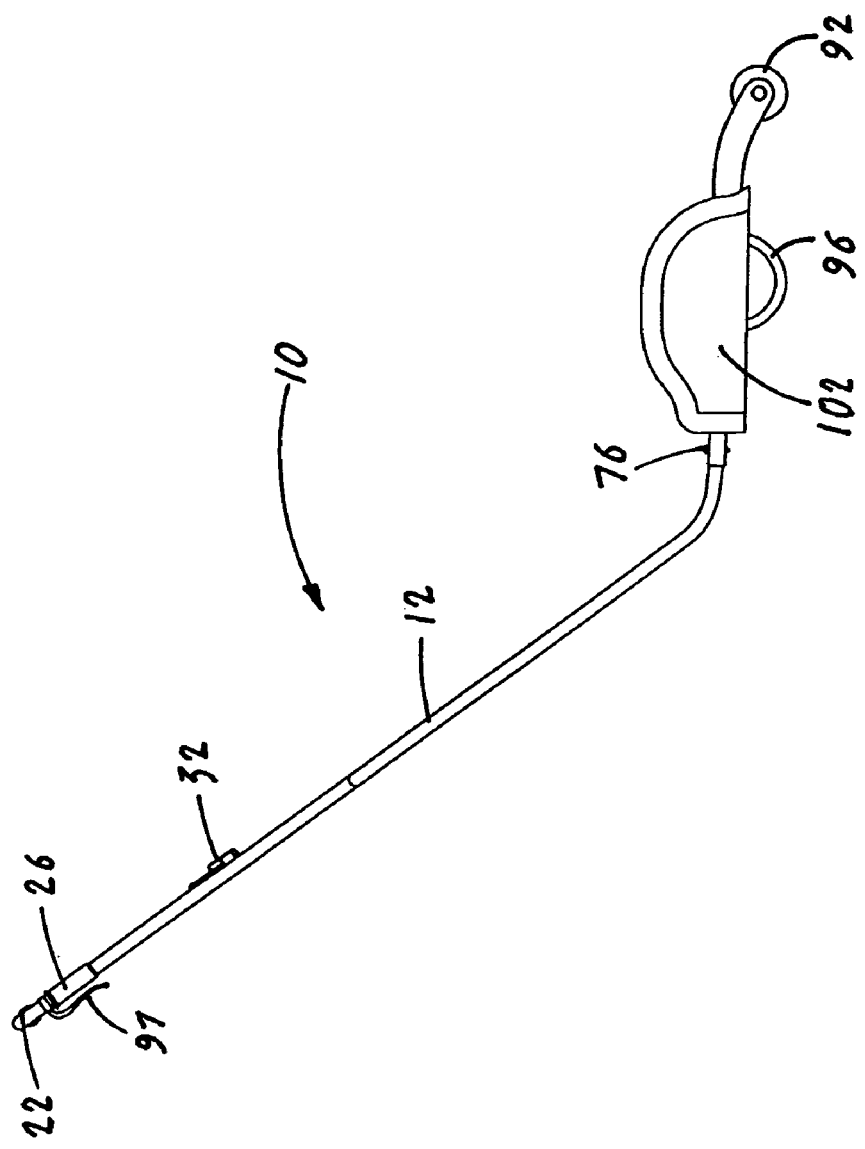
FIG. 2 is a side elevational view of the PAD.
Figure 3:
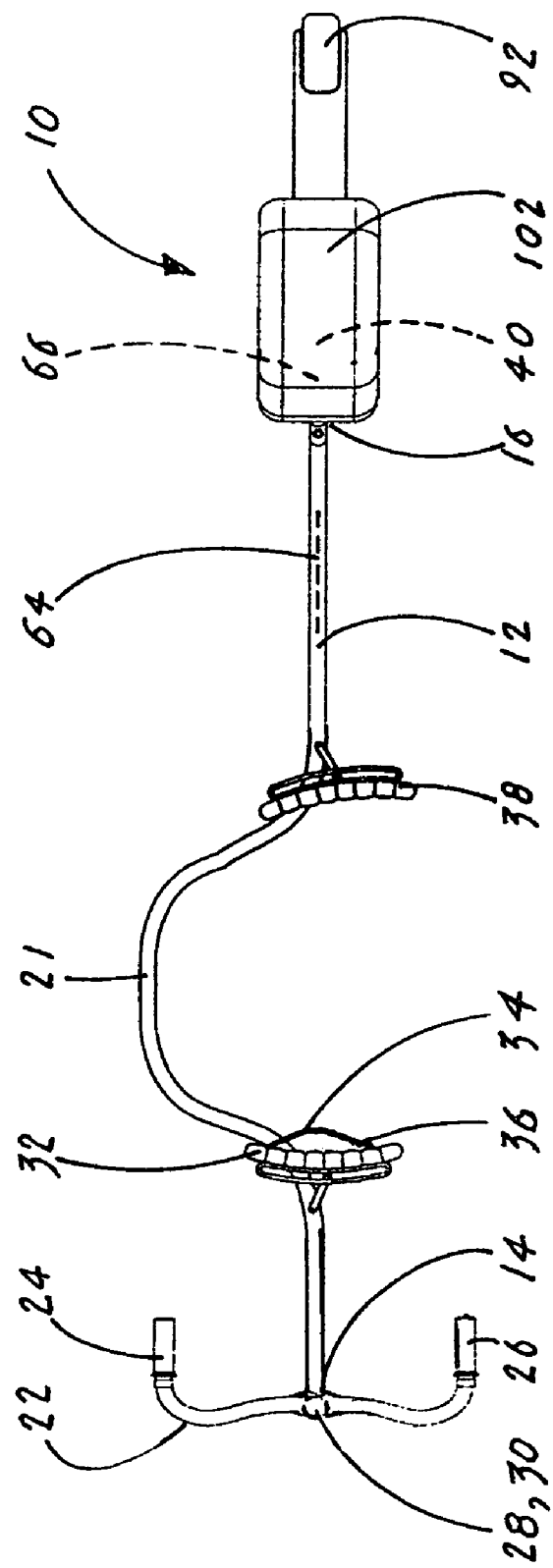
FIG. 3 is a top plan view of the PAD.
Figure 4:
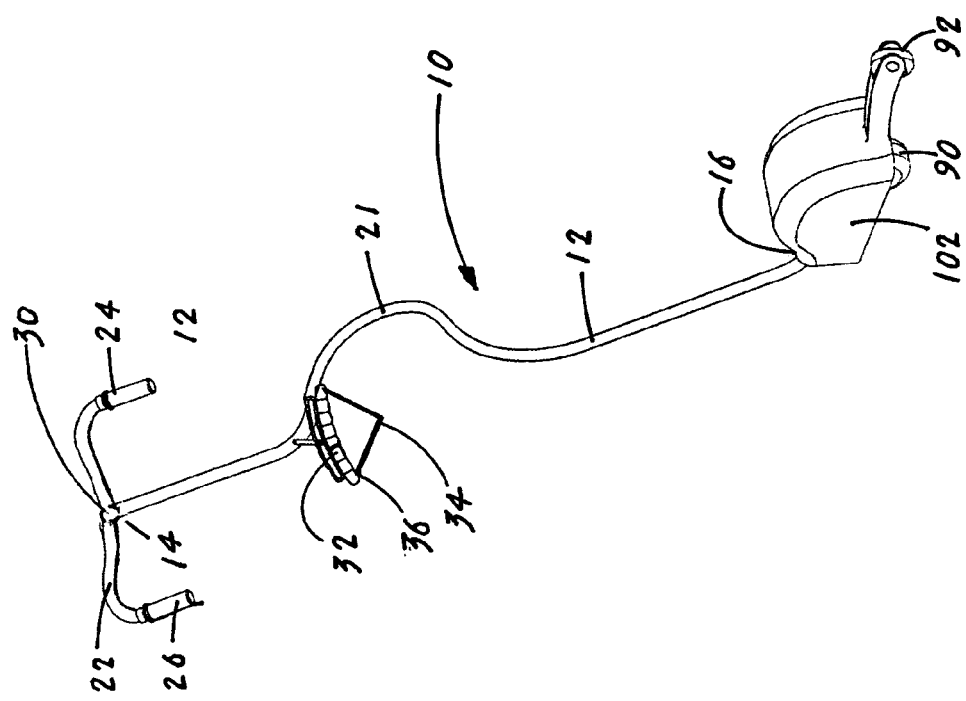
FIG. 4 is an orthographic view of the PAD.
Figure 6:
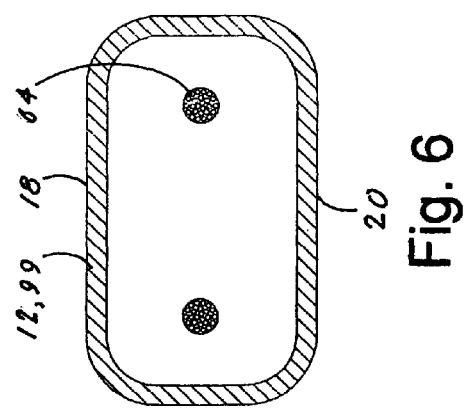
FIG. 6 is a cross-sectional view of a rectangular attachment tube.

The attachment tube 12, as shown in FIGS. 1-7, functions as a main frame and has a front end 14, a rear end 16, an upper surface 18 and a lower surface 20. As shown in FIGS. 1 and 2, to compensate for the height of a PAD rider, the attachment tube 12 is angled or curved upward so that the front end 14 of the attachment tube 12 is elevated from the rear end 16 of the tube 12. Additionally, the tube 12, as shown in FIGS. 3 and 4, has a right or left body curve 21 that extends horizontally around the side of the PAD rider. The body curve 21 allows a PAD rider to be aligned in a straight center line that extends from the front end 14 to the rear end 16 of the attachment tube 12.

Figure 5:
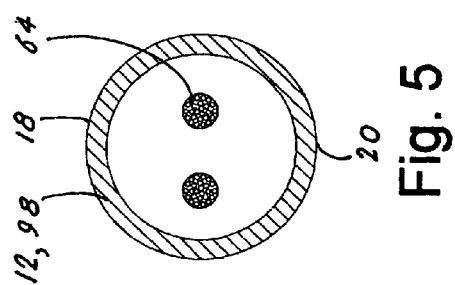
FIG. 5 is a cross-sectional view of a circular attachment tube.
Figure 7:
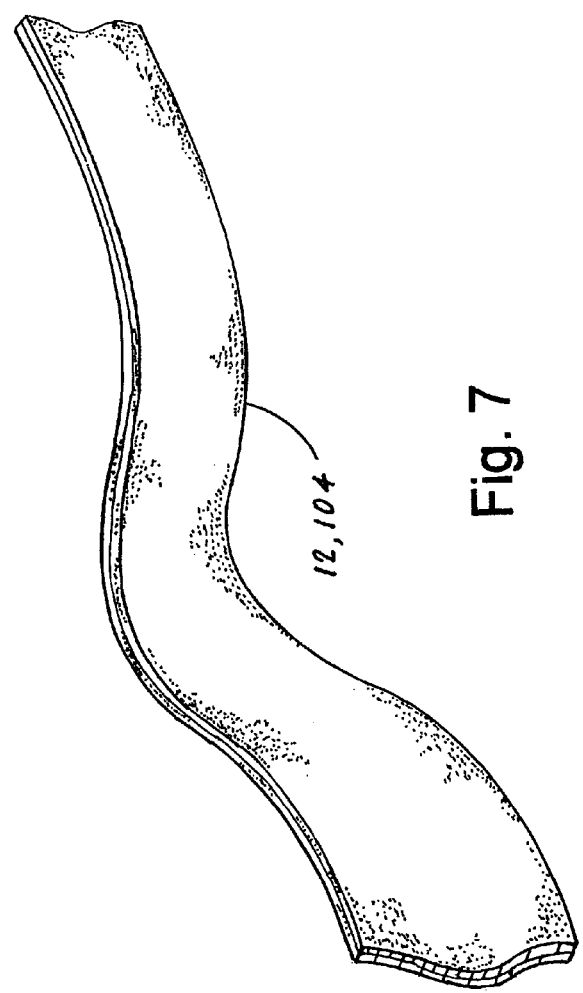
FIG. 7 is a side elevational view of a laminated main frame.

The attachment tube 12 is made of a material that is selected from the group consisting of metal, carbon fiber, laminated wood and fiberglass. The main frame or tube 12 can also have various cross sections such as a circular cross-section 98, as shown in FIG. 5, a rectangular cross-section 99, as shown in FIG. 4, or a laminated section 104, as shown in FIG. 7. The laminated section 104 has a curved structure and provides optimal lateral and longitudinal shear strength.

To allow a PAD rider to guide and control the operation of the PAD 10, a handle bar 22, as shown in FIGS. 3 and 4, is utilized that includes a right hand grip 24, a left hand grip 26 and a center section 28. The center section 28 is has a post that is rotatably inserted and attached to a vertical post sleeve 30 that is located on the front end 14 of the attachment tube 12, as best shown in FIGS. 3 and 4.

To provide a comfortable and safe ride for the PAD rider, a front body support 32 is utilized, as shown in FIGS. 3 and 4. The front body support 32 is adjustably attached to the upper surface 18 of the attachment tube 12, rearward from the handle bar 22. An optional rear body support 38 can also be adjustably attached to the upper surface 18 of the attachment tube 12, rearward from the front body support 32, as shown in FIG. 3. Both the front and rear body supports 32,38 are padded and contoured to interface respectively with the abdomen and the lower back of the PAD rider.

The rear surface of the front body support 32 is preferably designed to include a body pull tether 34 that is attached in a semi-taut condition to each side 36 of the front body support 32, as shown in FIG. 3. The rider wears a harness or a belt (not shown) that contains an open hook positioned on the rider's abdominal area. The rider can then elect to engage the tether 34 to the open hook and conversely to disengage the tether with ease. The body pull tether 34 allows the PAD rider's body to alleviate the pressure that is applied to the hands and arms of the PAD rider when executing a tight right or left turn or a high-speed acceleration burst.

The PAD 10 is designed to be operated by a drive-wheel powering means 40 that can be comprised of the electrical power circuit 42 which is preferred, or the internal combustion engine system 78.

Figure 8:
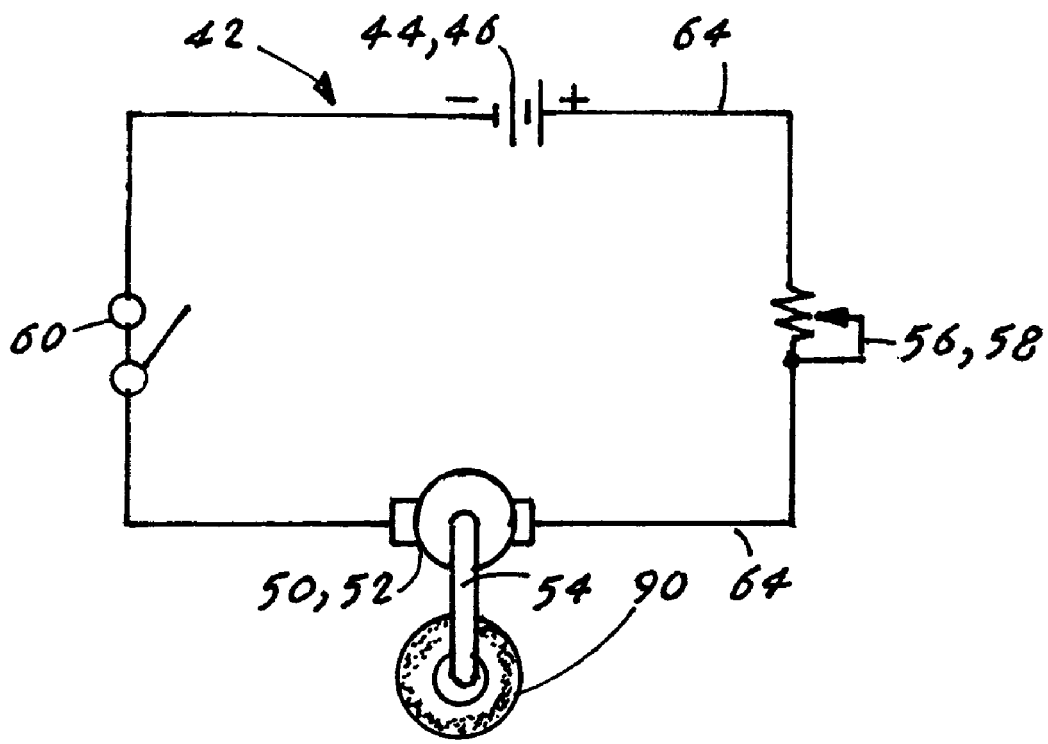
FIG. 8 is a schematic diagram of a drive-wheel powering means that is comprised of an electrical power circuit.

The electrical power circuit 42, as shown in FIG. 8, is comprised of

- A battery 44 having a positive (+) terminal and a negative (−) terminal. The battery is preferably comprised of a rechargeable battery 46.
- An electric d-c motor 50 having an electrical input, an electrical output and a shaft 54 that is attached to the drive wheel 90. Preferably, the motor 50 is comprised of variable-speed d-c motor 52.
- A variable resistor 56 such as a rheostat 58 that is connected between the (+) terminal of the battery 44,46 and the electrical input of the d-c motor 50,52. The variable resistor 56,58 is preferably designed to be an integral element of one of the hand grips 24,26.
- A power switch 60 that is connected between the electrical output of the electric d-c motor 50,52 and the (−) terminal of the battery 44,46.

When the power switch 60 is placed in an ON position, the electrical power circuit 42 is activated, thereby allowing the variable resistor 56,58 to control the speed of the electric d-c motor 50,52 which in turn, controls the rotational speed of the drive wheel 90 causing the PAD 10 to move forward.

Figure 9:
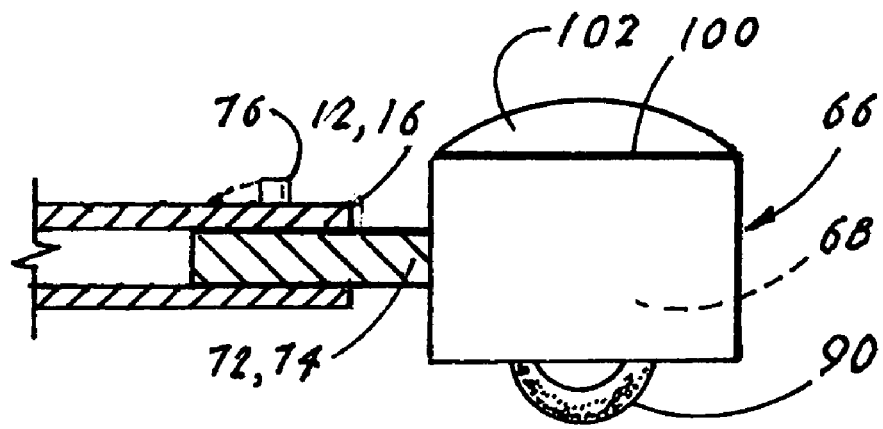
FIG. 9 is a side cross-sectional view of a means for allowing a mounting structure to be attached to the rear end of the attachment tube.

The elements that comprise the electrical power circuit 42, less the variable resistor 56,58, are enclosed together with the drive wheel 90 in a mounting structure 66. The mounting structure 66 can be attached to the rear end 16 of the attachment tube 12 by a variety of attachment means 72. One attachment means 72, as shown in FIG. 9, utilizes a solid rod 74 that is rigidly attached to and that extends forward from the mounting structure 66. The rod 74 is dimensioned to be frictionally inserted into the rear end 16 of the attachment tube 12. Once inserted, the rod 74 is secured to the attachment tube 12 by a tethered locking pin 76 or optionally by a plurality of set screws (not shown). This attachment means 72 allows the mounting structure 66 to be easily removed from the PAD 10 for repair or for preventive maintenance.

The mounting structure 66 has securing means 68 for securing the battery 44,46 and the electric d-c motor 50,52 with the drive wheel 90 directly attached to the shaft 54 of the motor 50,52 or by means of a chain or belt drive. The variable resistor 56,58 is integral to and is controlled by either the right hand grip 24 or the left hand grip 26. The electrical wiring 64 from the electrical power circuit 42 is routed through the attachment tube 12 to the variable resistor 56,58. The mounting structure 66 is also designed to provide an even distribution of weight between the electrical motor 50,52 and the battery 44,46.

Figure 10:
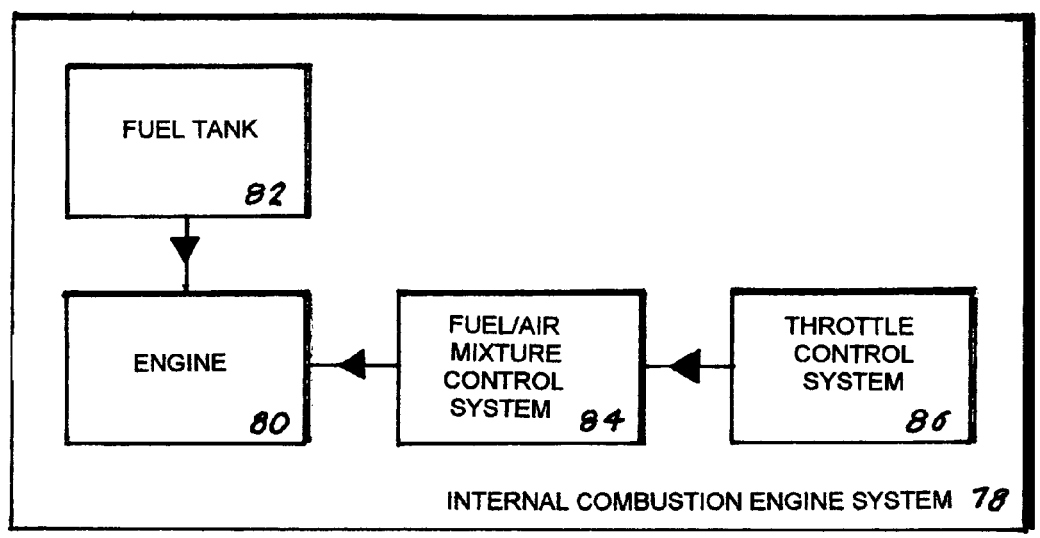
FIG. 10 is a block diagram of a drive-wheel powering means that is comprised of an internal combustion engine system.

The internal combustion engine system 78, as shown in FIG. 10, is comprised of a typical engine system 78 that includes an engine 80, a fuel tank 82 that is connected to the engine 80, a fuel/air mixing control system 84 that is also connected to the engine 80, and a throttle control 86 that is an integral element of one of the hand grips 24,26 located on the handle bar 22.

The elements that comprise the internal combustion engine system 80 are enclosed in a similar mounting structure 66 as described above for the electrical power circuit 42. The mounting structure 66 for either the electrical power circuit 42 or for the internal combustion engine system 78 can be designed to include an upper edge 100 to which can be removably attached a protective housing 102, as shown in FIGS. 3 and 4.

To increase the utility of the PAD 10 a trailing wheel 92 and a brake 94 such as a disc brake 96 or a centrifugal clutch can be included. The trailing wheel 92, as shown in FIG. 2, can be attached to the rear end 16 of the attachment tube 12 by a bracket or to the rear end of the mounting structure 66 also by a bracket or the like. The trailing wheel 92 stabilizes the operation of the PAD 10 by preventing the front of the PAD 10 from inadvertently rising when acceleration power is applied. The brake 94 is comprised of a typical bicycle braking system having a set of brake pads that interface with the drive wheel 90. The brake pads are operated by a brake cable or a hydraulic line that is activated by a hand-controlled lever 97 that is attached to one side of the handle bar 22, as shown in FIG. 2.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A power application device (PAD) that interfaces with a PAD rider and an external, foot-operated wheeled vehicle, comprising a skateboard having a two-wheeled front truck and a two-wheeled rear truck said PAD comprising:
   a) a main frame or attachment tube having:
      (1) a front end, a rear end, an upper surface and a lower surface,
      (2) a circular cross-section, a rectangular cross-section or a laminated cross-section,
      (3) a front end that is elevated from the rear end of said attachment tube to compensate for the height of the PAD rider, and
      (4) a right or a left body curve that extends horizontally around the side of the PAD rider,
   b) a handle bar having a right grip, a left grip and a center section having a post that is inserted into a vertical post sleeve located on the front end of said attachment tube,
   c) a front body support that is adjustably attached to the upper surface of said attachment tube rearward from said handle bar, and
   d) a drive wheel that is rotatably attached to the rear end of said attachment tube, wherein said drive wheel is rotated by a drive-wheel powering means that is controlled by the PAD rider.

2. A power application device (PAD) that interfaces with a PAD rider and an external, foot-operated wheeled vehicle, wherein said PAD comprises:
   a) a main frame or attachment tube having a front end, a rear end, an upper surface and a lower surface,
   b) a handle bar having a right hand grip, a left hand grip and a center mounting post that is rotatably attached to a vertical post sleeve located on the front end of said attachment tube, c) a front body support that is adjustably attached to the upper surface of said attachment tube rearward from said handle bar,
d) a body pull tether attached to the rear surface of said front body support, wherein the tether is attached to a hook located on a harness or belt worn by the PAD rider,
e) an optional rear body support that is adjustably attached to the upper surface of said attachment tube rearward from said front body support,
f) a drive-wheel powering means comprised of an electrical power circuit comprising:
   (1) a battery having a positive (+) terminal and a negative (−) terminal,
   (2) an electric d-c motor having an electrical input, an electrical output and an output shaft that is attached directly to said drive wheel, or by a chain drive or a belt drive,
   (3) a variable resistor connected between the (+) terminal of said battery and the electrical input of said electric d-c motor,
   (4) a power switch connected between the electrical output of said electrical motor and the (−) terminal of said battery, wherein when said power switch is placed in an ON position, the electrical power circuit is activated, thereby allowing said variable resistor to control the speed of said electric d-c motor which in turn, controls the rotational speed of the drive wheel,
g) a mounting structure having means for being attached to the rear end of said attachment tube, wherein said mounting structure having means for securing said battery and said electric d-c motor with the attached drive wheel, wherein said variable resistor is an integral element of either the right or the left hand grip, wherein the electrical wiring from said electrical power circuit is routed through said attachment tube and attached to said variable resistor, and
h) a disk brake that is attached to one side of said drive wheel, wherein said disk brake is operated by a brake cable or hydraulic line that is operated by a hand-controlled lever that is attached to one side of said handle bar.

3. The PAD as specified in claim 2 wherein said mounting structure attachment means comprises a solid rod that is rigidly attached to and that extends forward from said mounting structure, wherein the rod is dimensioned to be frictionally inserted into the rear end of said attachment tube and secured thereto by a tethered locking pin.

4. The PAD as specified in claim 2 wherein said attachment tube has:
   a) a circular cross-section, a rectangular cross-section or a laminated cross-section,
   b) a front end that is elevated from the rear end of said attachment tube to compensate for the height of the PAD rider, and
   c) a right or a left body curve that extends horizontally around the side of the PAD rider.

5. The PAD as specified in claim 2 wherein said front and rear body supports are padded and contoured to interface respectively with the abdomen and the lower back area of the PAD rider.

6. The PAD as specified in claim 5 wherein the front body support has a rear surface to which is attached the body pull tether, wherein the tether is releasably attached to an open hook located on a belt or harness that is attached around the abdominal area of a PAD rider.

7. The PAD as specified in claim 2 wherein said battery is comprised of a rechargeable battery.

8. The PAD as specified in claim 2 wherein said electric d-c motor is comprised of a variable-speed d-c motor having a shaft that is attached directly to said drive wheel or by means of a chain or belt drive.

9. The PAD as specified in claim 2 wherein said variable resistor is comprised of a rheostat.

10. The PAD as specified in claim 2 wherein said mounting structure is designed to provide an even distribution of weight when said electrical d-c motor and said battery are secured.

11. The PAD as specified in claim 2 further comprising a trailing-wheel that is attached by an attachment means to the rear end of said attachment tube, wherein said trailing wheel stabilizes said PAD.

* * * * *